Jan. 22, 1957  A. C. ATTENDU  2,778,674
AIRPORT AND TRANSFER BUSES
Filed Dec. 8, 1953  5 Sheets-Sheet 3
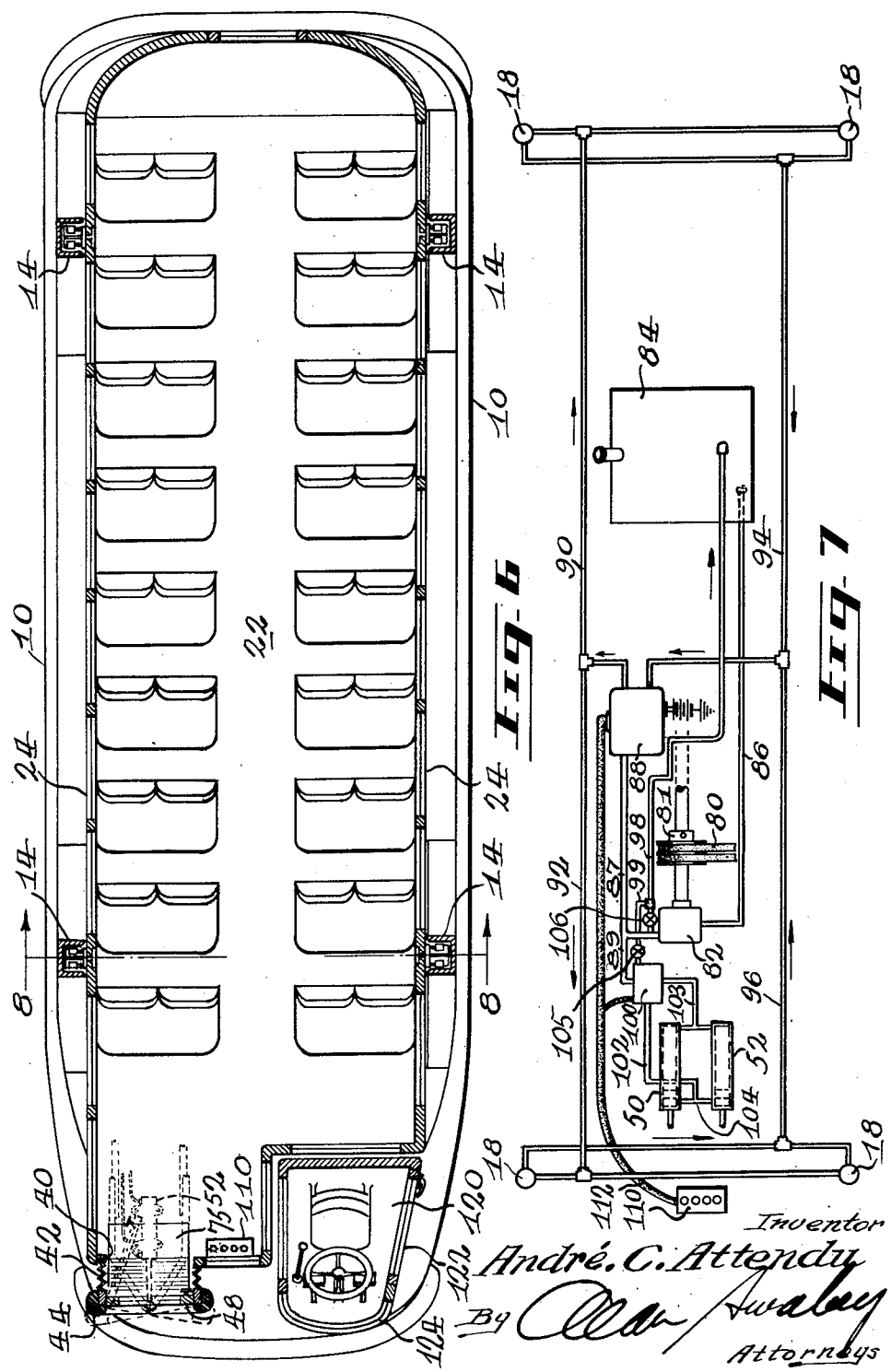
Inventor
André C. Attendu
By Allan Awalrey
Attorneys

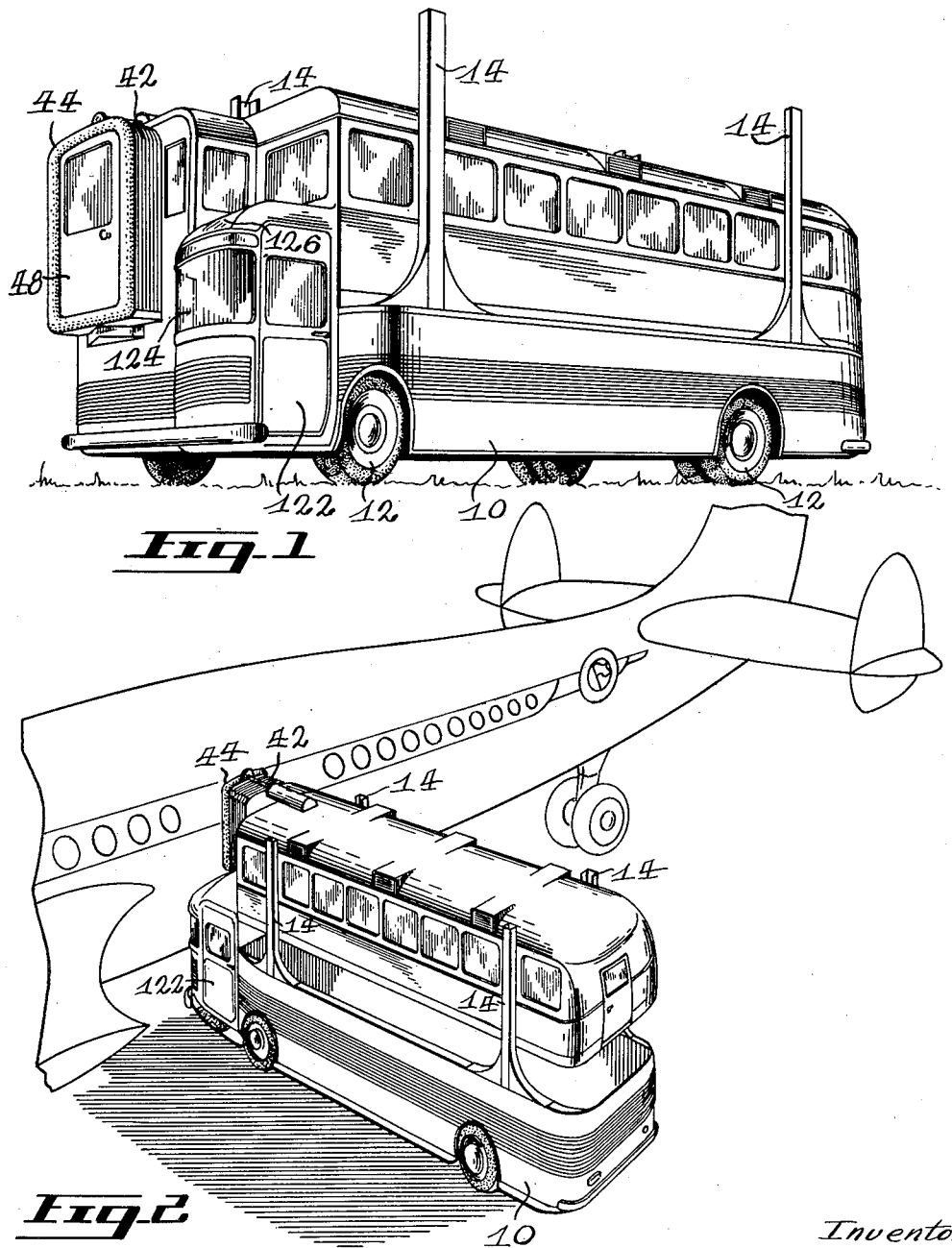

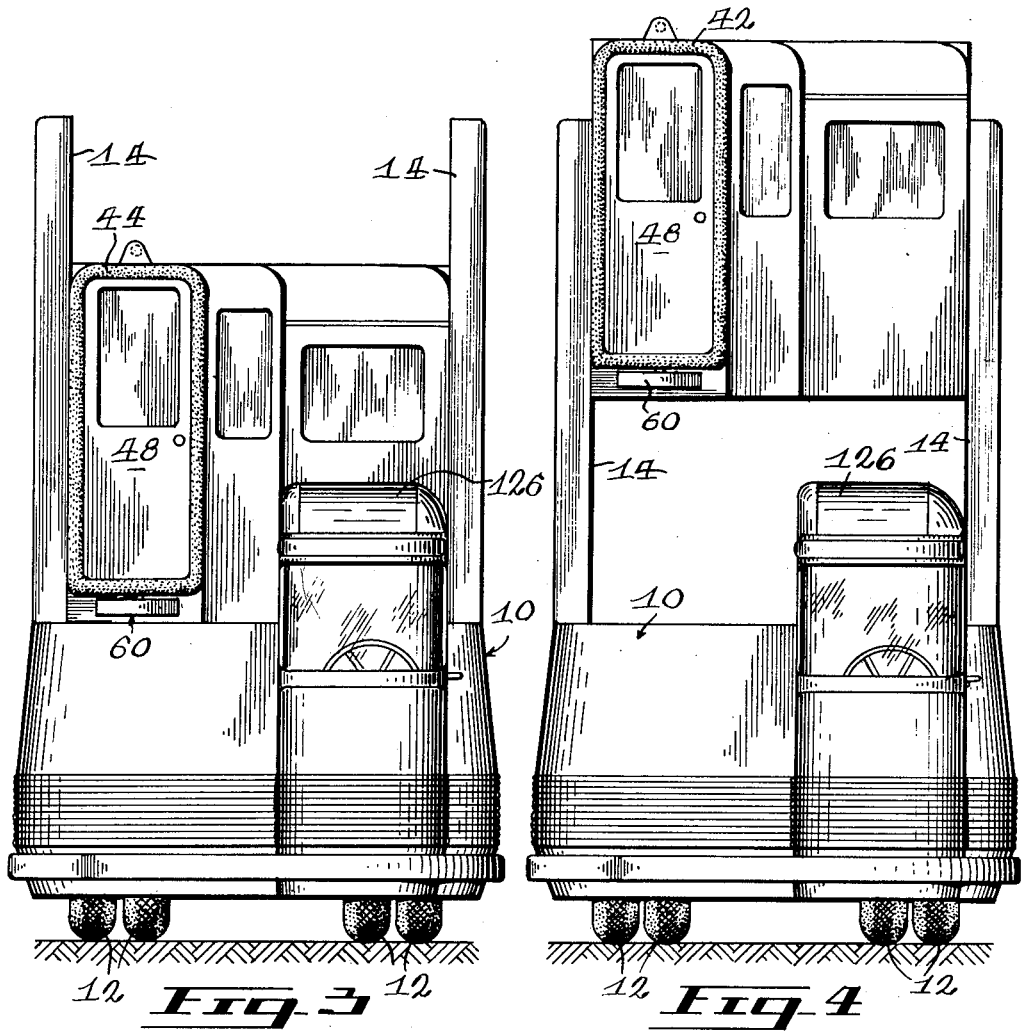
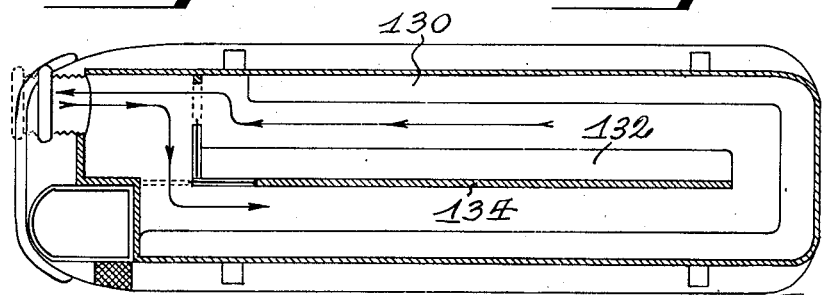

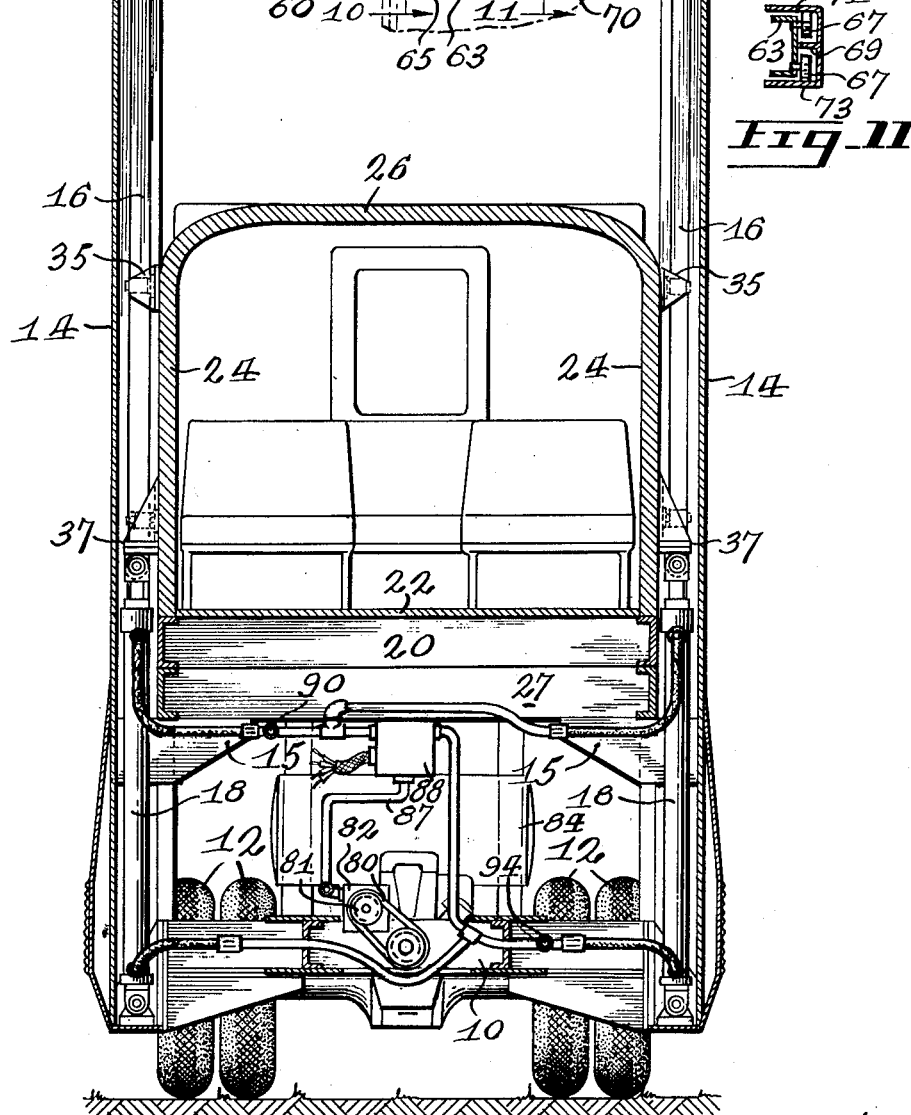

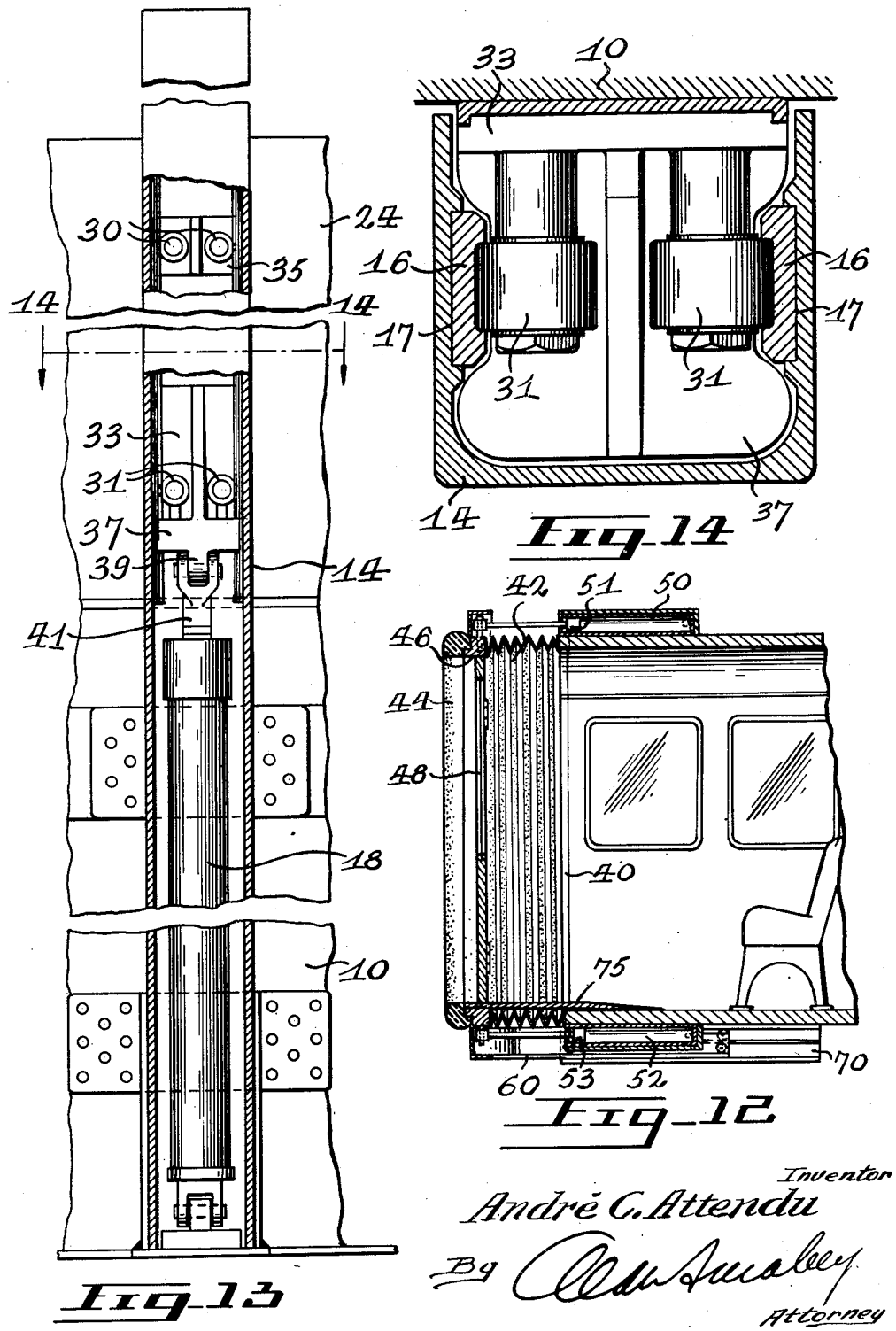

2,778,674

AIRPORT AND TRANSFER BUSES

Andre C. Attendu, Montreal, Quebec, Canada, assignor to Stadler, Hurter & Company, Montreal, Quebec, Canada Application December 8, 1953, Serial No. 396,898

6 Claims. (Cl. 296—28)

The present invention relates to the construction of vehicles adapted to transport passengers and more particularly to the construction of airport transfer buses.

At the present time, the trend of modern aircraft is towards larger and heavier machines so that landing strips and taxi strips have to be built wider and more strongly reinforced to withstand the increasing load. Also, in view of the increased size of aircraft, in general, the landing and take-off strips have to be located far enough away from airport buildings or surrounding obstructions to provide the necessary safety clearances.

The general practice at the present time is to taxi the aircraft to the loading area and then to the starting point of the runway. This practice, even at reduced speeds, consumes fuel, and as the loading area is necessarily restricted to a comparatively small space, the landing and take-off times are considerably increased. This is especially objectionable in busier airports where aircraft must land and take off with the minimum loss of time.

The present general practice of loading and unloading passengers necessitates the use of long terminal buildings so at least two aircraft can stand side by side on the apron. This requires at least a free space of some 500 feet for either plane to move in or out without interference. The crowding of the aircraft on the apron and their nearness to the terminal enhances the possibility of fire so that protective measures must be taken by providing at least one fire wagon close to the terminal.

Also, according to the wind direction, aircraft may have to travel considerable distances to and from the terminal loading area, and to the take-off point, all of which takes time and as previously mentioned is fuel consuming.

In most airports passengers now have to walk from the waiting room in the terminal building to the plane out on the loading area, a distance which is anywhere between 100 and 300 feet or more, and then have to ascend a flight of stairs or steps to reach the aircraft door which is sometimes as high as ten feet above the ground. In cold, windy and rainy weather or snow, as well as on very hot days, this method of loading is most objectionable.

These problems will grow increasingly worse with the common use of aircraft utilizing jet engines. When aircraft of this nature are utilized, they will have to be towed to the loading area in front of the terminal building, and once boarded by the passengers towed back to the point of take-off. This towing operation will be necessary due to the fact that jet type engines are tremendous fuel consumers so that taxiing would not be economical. The other very serious reason is that the blast and heat from the exhaust of a jet engine would most certainly constitute a danger both to the passengers and a fire hazard if planes of this nature were to taxi close to the terminal.

The present invention recognized these problems and aims to provide a means of eliminating all these inconveniences, speeding up the loading and take-off of aircraft, eliminating the usual taxi strips and providing a means of transporting the passengers in comfort directly into the aircraft which may be positioned in take-off location.

Accordingly, the invention is an auto-bus that is adapted to transport passengers to and from aircraft which comprises in combination, a main chassis provided with the usual wheels and a prime mover adapted to actuate, certain of the wheels, a lower body mounted on the chassis, spaced apart standards extending from the chassis, and an upper load carrying body, including an access opening, mounted between the standards for vertical movement relative to the lower body and chassis. Means are provided on the upper body and the uprights to guide the travel of the upper body and hydraulic jacks are mounted on the chassis so as to be adapted to raise and lower the upper body as desired.

More specifically, in accordance with a preferred construction, the upper body supporting standards are mounted on the chassis so as to extend vertically upwards therefrom in spaced-apart relationship and in opposed pairs, one pair adjacent to the front and one pair adjacent to the rear of the vehicle. The upper load carrying body is mounted on a supporting frame which in turn is mounted between the supporting standards so that guiding tracks provided on the standards are engaged by guiding rollers extending from the supporting frame. The supporting frame is provided with a reinforced floor frame and extensions of the standards extend inwardly of the lower body so as to support a second fixed floor frame in order that the floor of the supporting frame rests on the second floor frame holding the upper body above the chassis in a position where passengers can proceed directly from a raised loading platform into the access opening.

Preferably, the upper bus body is of sufficient capacity to accommodate in one trip all the passengers which can be carried by the aircraft. In most aspects, the body of the bus and the chassis is of a standard type in general with modifications being made in accordance with the present invention.

The upper body access door is provided with a bellows extension so that when the bus is moved out to the landing strip, and the upper load carrying body has been raised to align with the opening in the aircraft, the bellows can be extended so as to form an enclosure leading directly from the interior of the upper body of the bus to the interior of the aircraft.

The raising of the upper body is accomplished in accordance with the preferred construction, by four hydraulic jacks which are mounted adjacent to and in alignment with the supporting standards so that the lifting power is applied in alignment with the body guiding means. Safety brakes, which operate on the same principle as ordinary elevator brakes, keep the upper bus body from falling in case of a power failure. A master control system is provided so that the raising or lowering of the body and extension and retraction of the bellows surrounding the access opening can be controlled by an operator positioned in the upper body.

The bus driving controls remain in the same location as in a standard bus. The driver sits in a cab built on the bus chassis with access to the cab being through a door located on the side of the cab. The cab is provided with a windshield and a plastic transparent roof to give the driver a clear view of the road or the unloading operation.

Having thus generally described the nature of the invention, particular reference will be made to the accompanying drawings, wherein there is shown by way of illustration a preferred embodiment of a transfer bus constructed in accordance with the present invention, and in which:

Figure 1 is a diagrammatic view, in perspective elevation, of a transfer bus constructed in accordance with the present invention.

Figure 2 is a diagrammatic view of the bus construction shown in Figure 1, as it would appear in operating position adjacent to an aircraft.

Figure 3 is a view in front elevation of the bus construction shown in Figure 1 with the upper bus body shown in the lower terminal position.

Figure 4 is a view corresponding in location to Figure 3, with the upper bus body shown in the upper terminal position.

Figure 5 is a sectional view in plan of a diagrammatic layout of a transfer bus according to the invention with an alternate seating arrangement whereby incoming and outgoing passengers are guided to and from the access door.

Figure 6 is a diagrammatic view in plan of the bus construction shown in Figures 1, 3 and 4, with the roof of the bus removed to show the construction in more detail.

Figure 7 is a diagrammatic view of the hydraulic system operating the lifting jacks and bellows advancing cylinders.

Figure 8 is an enlarged cross-sectional view of the bus construction shown in Figure 6, along the line 8—8.

Figure 9 is an enlarged detail view of the lower hydraulic cylinder for advancing or retracting the bellows arrangement, and the supporting slide frame connected to the piston of the cylinder.

Figure 10 is a cross sectional view along the line 10—10 of Figure 9.

Figure 11 is a cross sectional view along the line 11—11 of Figure 9.

Figure 12 is an enlarged diagrammatic view, partially in section, of the front portion of the upper body of the bus to illustrate the bellows arrangement, bellows advancing cylinders, and sliding floor plate.

Figure 13 is an enlarged detail view of one of the guiding and supporting standards to which the upper body is secured.

Figure 14 is a cross sectional view of the upper portion of the standard shown in Figure 13, to illustrate in more detail the guiding roller and track arrangement.

With particular reference to Figures 1, 2, 3, and 4 of the drawings an airport transfer auto-bus in accordance with the present invention is preferably constructed so as to accommodate approximately 44 to 47 people which is the full complement of most of today's aircraft. As will be apparent from the accompanying drawings, the present construction has been designed around a standard bus and endeavor has been made to use the standard frame and body with the minimum alterations. It will be understood that other and varied types of bus constructions might be employed and modified to incorporate the present features.

In the present construction, the main chassis or frame 10 is provided with the usual springs and the like and wheels 12 are mounted in the chassis in the usual manner. The usual prime mover or motive power is utilized with a take-off from the prime mover, for example, the shaft driving the motor cooling fans providing the necessary power to drive a hydraulic pressure pump through which the actuation of the upper body is accomplished. This arrangement will be described in more detail later.

Opposed pairs of supporting uprights or standards 14 are secured to the chassis 10 so as to extend vertically upwards therefrom adjacent the front and rear of the chassis 10. Each of the standards 14 is substantially U-shaped in cross section and is provided in its upper portion with opposed guiding tracks 16. Preferably, the tracks 16 are inserted as separate units within grooves 17 provided in the side flanges of the supports 14. Hydraulic jacks 18 are mounted to the chassis 10 adjacent each support 14 so as to extend upwards within the lower portion of the supports to a connection with a body supporting frame 20.

The body supporting frame 20 provides the framework for the upper bus body adapted to accommodate the passengers. This frame includes a lower portion 22 to which there are attached side and top frame members 24, 26, over which is mounted the usual body. The supporting frame 20 is mounted for sliding movement relative to the supports or standards 14 by the engagement of rollers 30, 31 with the tracks 16. The rollers 30 are mounted on brackets 33 secured to the supporting framework of the body while the rollers 31 are mounted on brackets 35. The brackets 33 include a flange 37 shaped to conform with the interior of the supports 14 and a dependent eye portion 39 to which is connected the piston 41 of each of the jacks 18. Upon actuation of the jacks the supporting framework 20 and the entire upper load carrying body can be raised or lowered parallel to and in relationship with the lower body portion 34. The floor portion 22 in the lower terminal position rests on the supporting frame 27 mounted over the chassis 10 by plates 15 extending from the standards 14.

The upper body of the bus includes an access door opening 40 adjacent to the front end and the access opening 40 is provided with a bellows extension 42 which is adapted to be extended or retracted relative to the front portion of the bus. The bellows extension 42 surrounds the access opening 40 of the bus body and the outer face of the bellows 42 is provided with a sealing and shock absorbent frame 44 which is mounted on and is carried by a door frame 46 wherein there is mounted a door 48. The bellows assembly 42 is extended and retracted through the action of hydraulic cylinders 50 and 52 which are mounted at the top and at the bottom of the upper bus body respectively with pistons 51, 53 extending from the cylinders 50, 52 acting on the door frame 46.

In order to allow the front sealing frame 44 of the bellows construction 42 to adapt itself to the surface of an aircraft, which may be at an angle relative to the access opening of the bus, the connections between the frame 46 and the pistons 51 and 53, are made centrally of the upper and lower transverse members of the frame so that the frame 46 can pivot.

The frame 46 and bellows 42 are supported for horizontal reciprocal movement by a sliding frame 60 having a tapering front portion 62 to allow for the pivotal movement of the frame 46, and spaced apart main supporting legs 63 which extend beneath the front portion of the bus body. The frame members 63 are supported for sliding movement relative to the bus body by a track and roller system as shown in Figures 9, 10 and 11. Each frame member 63 is provided with a front set of rollers 65 which engage with centre flanges 69 on guiding tracks 70 secured in spaced apart alignment beneath the floor of the bus while second sets of rollers 67 mounted adjacent the rear of the supporting members 63 engage with upper 71 and lower 73 flanges of the guiding tracks 70 secured to the bus.

With this arrangement, extension of the piston 53 through the cylinder 52 also extends the supporting frame 60 and the door frame 46 and the bellows extension 42 is thus supported against deflection by the weight of the passengers passing to or from the aircraft to the bus. A tread plate 75 is secured at one end to the frame 46 so as to extend above the lower portion of the bellows 42. The other end of the tread plate 75 is unattached to the bus body so that when extended by the movement of the pistons 51, 53, it slides over the top surface of the floor of the bus body, see Figure 12.

The actuation of the cylinders 50, 52 and the hydraulic jacks 18 by means of which the upper bus body is raised or lowered is accomplished through a hydraulic system mounted within the lower body portion. This hydraulic system is shown diagrammatically in Figure 7 wherein a take-off 80 from the prime mover is adapted through a clutch 81 to supply the necessary motive power to a hydraulic pump 82 which is supplied with hydraulic fluid from a reservoir 84 through a main conduit 86. A second conduit 87 extends from the discharge side of the pump 82 to a solenoid controlled master valve 88 from which the hydraulic fluid under pressure is distributed through conduits 90 and 92 to the body lifting jacks 18. Suitable return lines 94, 96 return the hydraulic fluid to the main valve 88 and a return pressure conduit 98 extends from the conduit 87 back to the reservoir 84. The conduit 87 includes an extension 89 which leads to a further solenoid master valve 100 from which fluid under pressure is selectively delivered to conduits 102, 104, leading to the bellows operating cylinders 50, 52. A return conduit 103 extends from the cylinders 50, 52 to the valve 100 and a back pressure line 99 extends from the valve 100 to the conduit 98. Pressure control valves 105, 106 are provided in the return lines 99, 98 to regulate the operating pressure of the hydraulic fluid. The master valves 100 and 82 are controlled through a control panel 110, the connection being made through an electrical conduit 112.

The steering, brake pedals, hand brake, starter and switches for the driving of the bus are located in the same positions as in a standard bus. The bus driver, however, does not control the opening or closing of the access door. The driver sits in the cab 120 built on the bus chassis 10, the access to his cab being through a door 122 located on the left-hand side of the cab. The windshield 124 and glass roof 126 give him a clear view of the road and the loading and unloading of the passengers. Once the bus is in loading or unloading position, he signals the attendant or operator standing in the upper bus body. The action of the jacks 18 through the pressing of the required button of the control panel 110 brings the floor of the upper bus body level with the door sill of the aircraft. Through another button on the control panel 110 the operator then moves the extension platform and bellows 42 to make contact with the plane entrance, then opens the door 48 so that the passengers can walk from the bus directly into the aircraft. The same procedure applies to unloading. Once the passengers have been transferred to the bus, the bellows extension of the door is again operated to bring the front portion into closed position, the upper bus body is lowered to travelling position, and the bus then proceeds to the terminal or aircraft depending to which location the transfer of passengers is necessary.

With reference to Figure 5, an alternative seating arrangement is shown so that the upper bus body is divided by a partitioning wall 134 so that the passengers going into the aircraft proceed along one aisle and passengers leaving the aircraft can enter the bus along another aisle simultaneously. The line of procedure is indicated by lines and arrows with the seats indicated at 130, 132. As will be appreciated, this seating arrangement will save considerable time in loading and unloading.

I claim:

1. A vehicle adapted for the transportation of passengers to and from aircraft; comprising in combination, a main chassis, wheels mounted on said chassis, a lower body mounted on said chassis, spaced apart standards extending from said chassis, an upper passenger carrying body mounted between said standards for vertical movement relative to said lower body, means on said upper body and upright standards to guide the travel of said upper body, hydraulic jacks mounted on said chassis and including pistons engaged with said upper body, and means for actuating said jacks, said upper body including an access opening provided with a bellows extension mounted on a supporting frame, said bellows extension supporting frame being slidably mounted on said upper body, a door mounted for pivotal movement on said bellows support- ing frame and in the front portion of said bellows extension, and a power means mounted on said upper body adapted to extend or retract said bellows extension supporting frame.

2. A vehicle adapted for the transportation of passengers to and from aircraft; comprising in combination, a main chassis, wheels mounted on said chassis, spaced apart standards mounted on and extending upwards from said chassis, a skirt mounted on and surrounding said chassis and the lower portion of said standards, a load supporting frame mounted between said standards for sliding movement between an upper terminal position and a lower terminal position relative to said chassis, a passenger carrying body mounted on said load supporting frame, guiding means on said standards and load supporting frame for guiding the movement of said frame, power actuated lifting means mounted on said chassis and engaged with said load supporting frame, power means for actuating said lifting means, said passenger carrying body including an access opening provided with a bellows extension, said bellows extension being mounted on a second supporting frame slidably mounted on said load supporting frame beneath said passenger carrying body, said bellows extension including a door pivotally mounted on said second supporting frame, and hydraulic means extending between said load supporting frame and slidably mounted second supporting frame adapted to extend or retract said second supporting frame.

3. An auto-bus, as claimed in claim 2, wherein said guiding means comprises guiding tracks mounted on said supporting standards and guiding rollers extending from said supporting frame engaged with said guiding tracks.

4. An auto-bus, as claimed in claim 2, wherein said standards extend considerably above said upper body when said supporting frame is in said lower terminal position.

5. A vehicle adapted for the transportation of passengers to and from aircraft; comprising in combination, a main chassis, wheels mounted on said chassis, a lower body and an upper passenger carrying body on said chassis, said upper passenger carrying body being mounted on said chassis for guided parallel movement towards and away from said lower body, power actuated lifting means mounted on said chassis and connected to said upper body, power means for actuating said lifting means, said upper body including an access door provided with a bellows extension mounted on a supporting frame, said bellows extension supporting frame being slidably mounted on said upper body, a door mounted for pivotal movement on said bellows extension supporting frame and in the front portion of said bellows extension, and power means mounted on said upper body adapted to extend or retract said bellows extension supporting frame.

6. A vehicle, as claimed in claim 5, including a prime mover mounted on said chassis and connected to certain of said wheels, and a take-off from said prime mover connected to said power means for actuating said lifting means and said bellows extension supporting frame power means.

References Cited in the file of this patent

UNITED STATES PATENTS

| 1,146,745 | Adler | July 13, 1915 |
| 1,261,633 | Shuford | Apr. 2, 1918 |
| 2,379,094 | Maxon | June 26, 1945 |
| 2,412,158 | Kuehlman et al. | Dec. 3, 1946 |
| 2,487,613 | Stone | Nov. 8, 1949 |
| 2,656,216 | Bobroff | Oct. 20, 1953 |

FOREIGN PATENTS

| 807,662 | Germany | July 2, 1951 |
| 399,100 | Italy | Oct. 16, 1947 |
| 115,853 | Switzerland | Feb. 1, 1927 |